United States Patent [19]

Maurer

[11] 4,225,000
[45] Sep. 30, 1980

[54] DOWN HOLE DRILLING MOTOR WITH PRESSURE BALANCED BEARING SEALS

[75] Inventor: William C. Maurer, Houston, Tex.

[73] Assignee: Maurer Engineering Inc., Houston, Tex.

[21] Appl. No.: 941,275

[22] Filed: Sep. 11, 1978

[51] Int. Cl.² .................................................. E21B 3/12
[52] U.S. Cl. ..................................... 175/107; 415/502
[58] Field of Search ................. 175/107, 104, 106; 415/502

[56] References Cited

U.S. PATENT DOCUMENTS

| | | | |
|---|---|---|---|
| 3,076,514 | 2/1963 | Garrison | 175/107 |
| 3,077,937 | 2/1963 | Tiraspolsky et al. | 175/107 |
| 3,133,603 | 5/1964 | Lagacherie et al. | 175/107 |
| 3,802,515 | 4/1974 | Flamand et al. | 415/502 |
| 3,997,009 | 12/1976 | Fox | 175/107 |
| 4,103,749 | 8/1978 | Erickson | 175/107 |

FOREIGN PATENT DOCUMENTS

| | | | |
|---|---|---|---|
| 762749 | 12/1956 | United Kingdom | 415/502 |
| 138903 | 4/1971 | U.S.S.R. | 415/502 |
| 543731 | 12/1977 | U.S.S.R. | 175/107 |

*Primary Examiner*—William F. Pate, III

*Attorney, Agent, or Firm*—Neal J. Mosely

[57] ABSTRACT

A downhole drilling motor, e.g. a turbodrill, which is connected to a string of drill pipe has a rotating shaft for driving a drill bit which may be a rotary bit or a high speed solid head diamond bit. The turbine section has rotor and stator blades which are crescent shaped in cross section with each blade having an exit angle of 14°–23° for maximum turbine efficiency. The drilling motor may alternatively be a positive displacement motor. The bearing shaft is provided with chevron rotary seals positioned below the rotary bearings carrying both radial and vertical thrust. Fluid lubricant fills the space from the rotary seals to a predetermined level above the bearings. A piston seals the lubricant chamber and is pressurized by drilling fluid (i.e. mud) flowing through the tool. A layer of lubricant fluid overlies the first piston and has a second piston covering said fluid and transmitting pressure from the drilling fluid to the lubricant fluid surrounding the bearings. The drilling mud is divided into two streams, one of which rotates the drill bit, and the other of which passes through the drill bit. The pressure drop across the drilling motor equals the pressure drop across the drill bit, thus balancing the pressure on the bearing seals.

5 Claims, 8 Drawing Figures

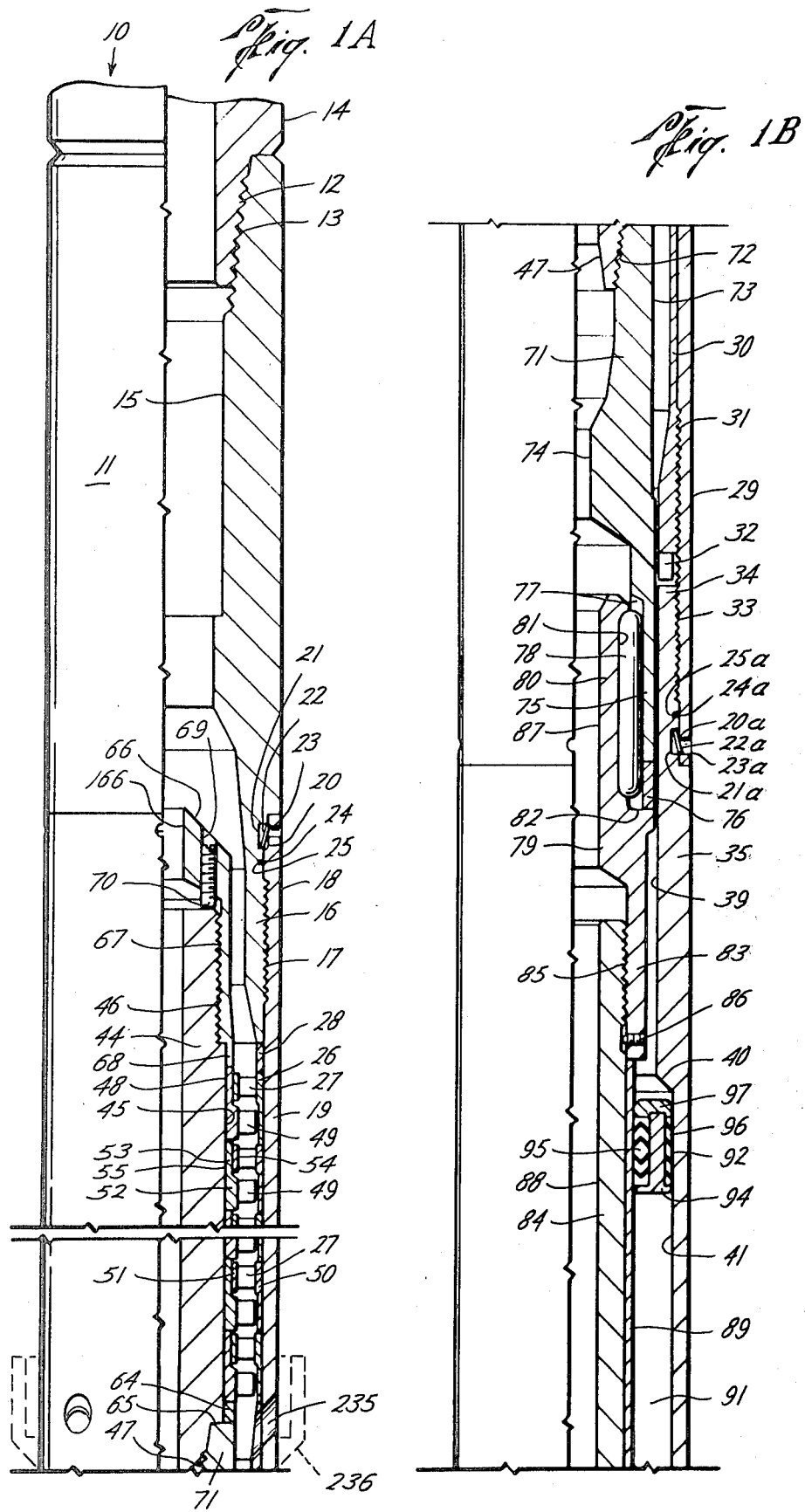

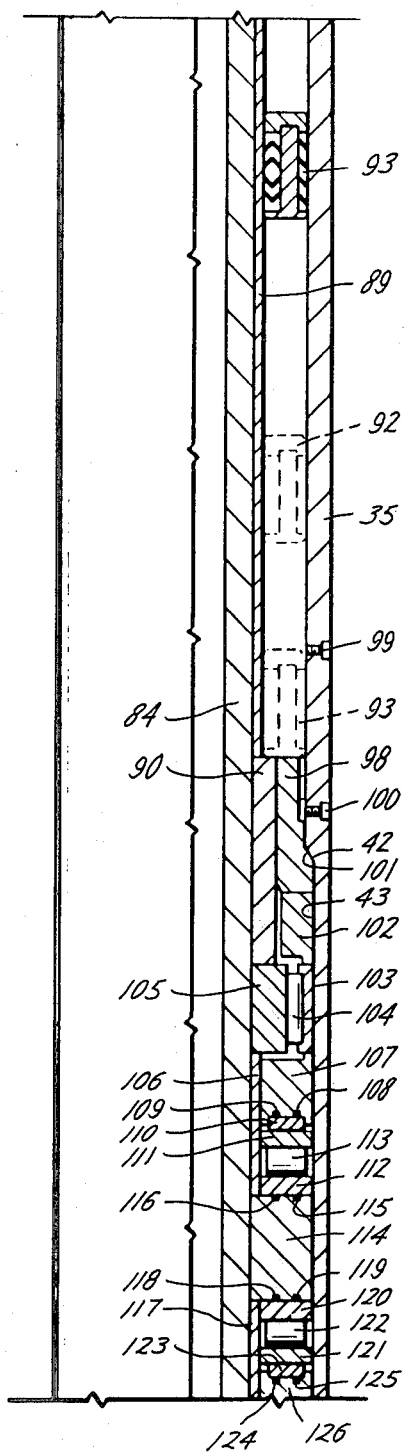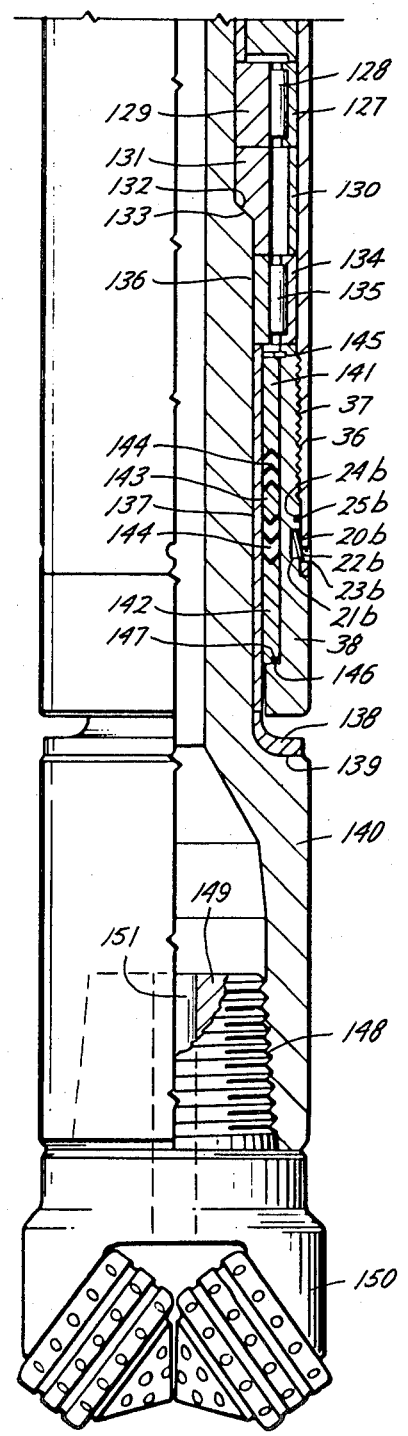

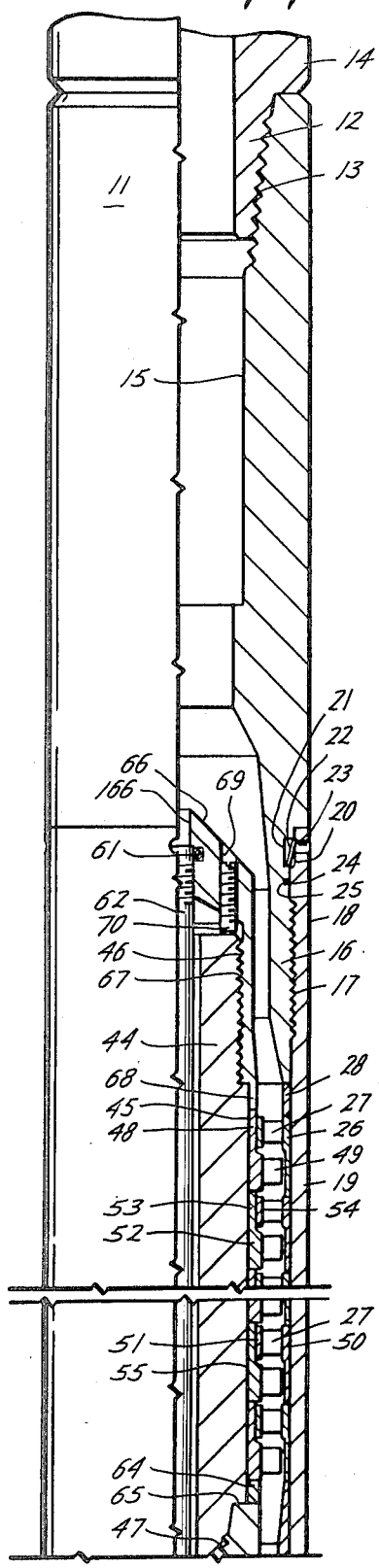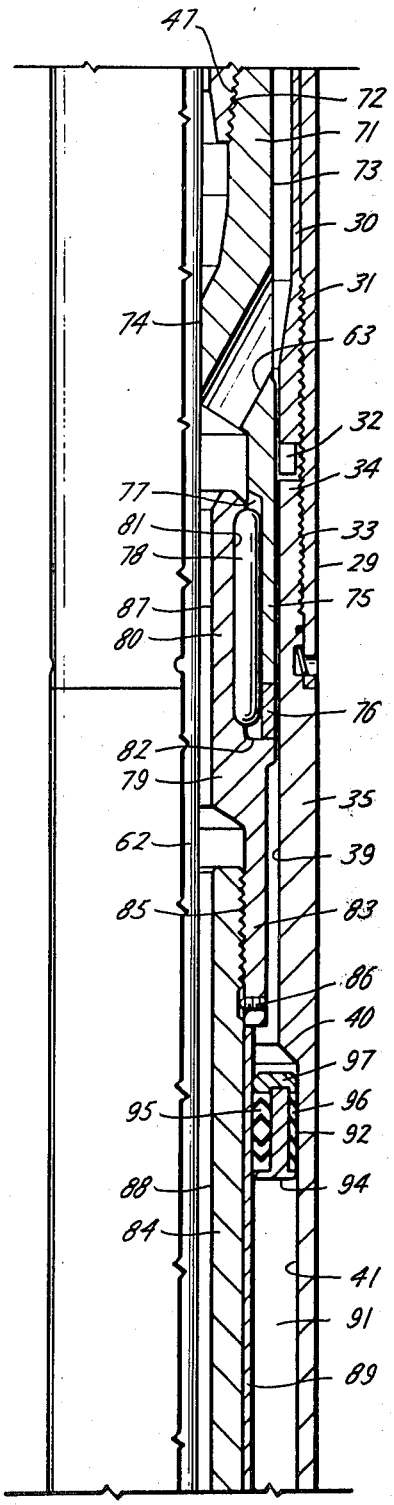

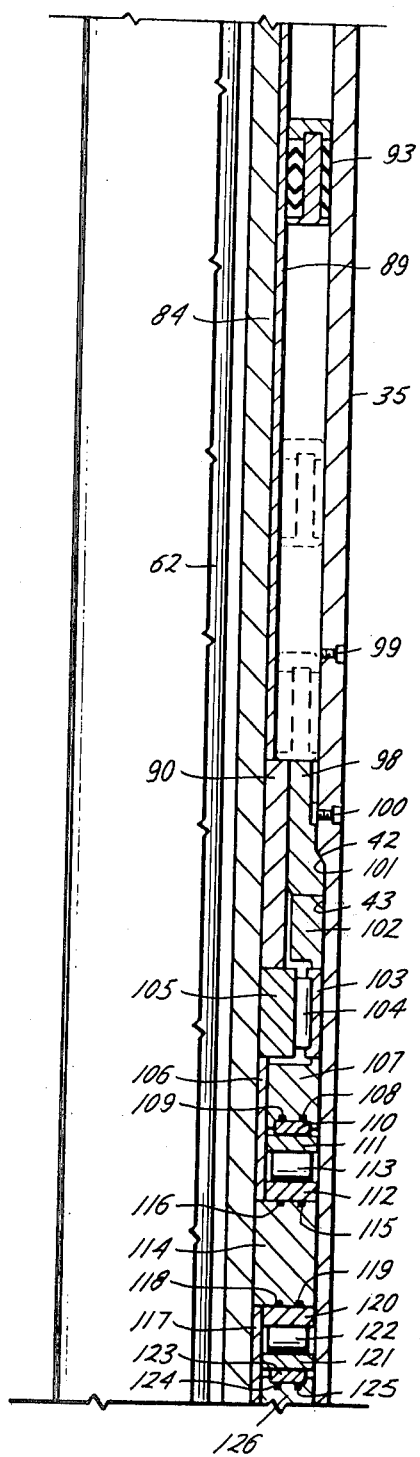
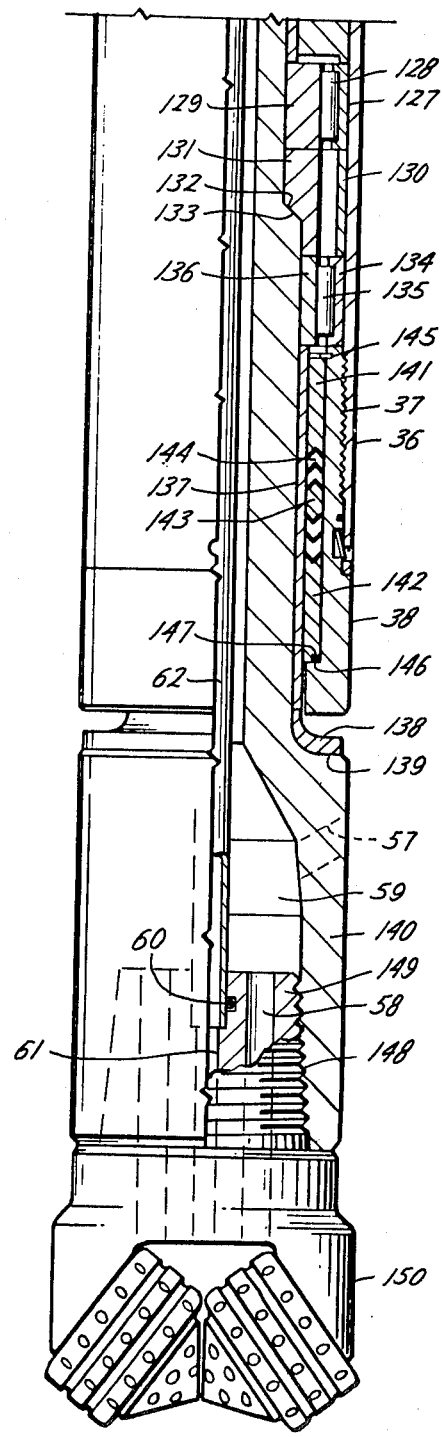

DOWN HOLE DRILLING MOTOR WITH PRESSURE BALANCED BEARING SEALS

CROSS REFERENCE TO RELATED APPLICATIONS

This application is related to commonly assigned applications Ser. Nos. 849,976; 849,977; 849,978; 849,979; and 849,988 filed on Nov. 9, 1977 and presents some commonly disclosed subject matter.

BACKGROUND OF THE INVENTION

1. Field of the Invention

This invention relates to down hole drilling motors, such as turbodrills and drills operated by positive displacement motors, and to certain improved features therein.

Down hole drilling motors were first invented 100 years ago. Down hole drilling motors were first extensively tested in the 1920's. They did not find wide spread use until the 1950's when turbodrills began to be used in the Soviet Union. By the early 1960's, it is estimated that 85% of the wells in the Soviet Union were being drilled with turbodrills. Down hole drilling motors have found wide spread use in the United States for drilling directional holes, but they are not widely used for straight hole drilling because of bearing and seal problems. Commercial down hole drilling motors operate at speeds ranging from 300 to 1,000 rpm whereas, roller bits operate most effectively at speeds of 50 to 150 rpm. At high motor speeds, roller bearings fail after periods of about 5 to 15 hours whereas with conventional drilling equipment operating at lower speeds the bearings of roller bits last up to 200 hours. Down hole motors have had substantial problems in design of radial and vertical thrust bearings, lubrication systems, turbine efficiency, housing construction, etc., which have limited substantially the acceptability of down hole motors in petroleum drilling and in other applications.

2. Brief Description of the Prior Art

Down hole drilling motors were patented soon after the advent of rotary drilling rigs in the 1860's. Cross U.S. Pat. No. 174,922 discloses a very primitive turbodrill. Baker U.S. Pat. No. 292,888 discloses a single stage axial flow turbodrill which is similar in some respects to modern turbodrills. Scharpenberg U.S. Pat. No. 1,482,702 discloses one of the earliest multi-stage turbodrills which was the forerunner of turbodrills currently in use. The Scharpenberg turbodrill contained a lubrication system which allowed the thrust bearing to operate in oil or grease. Drilling fluid acting on a floating piston pressurized the lubricant in the system. The bearings in modern turbodrills operate directly in the abrasive drilling mud, resulting in rapid failures, which limit the application of these drills.

Capeliuschnicoff U.S. Pat. No. 1,681,094 discloses a single staged geared turbodrill. These turbodrills were tested extensively in the Soviet Union from 1924 to 1934. The Russians had severe problems with the speed reducers Capeliuschnicoff turbodrill and subsequently changed to the Scharpenberg turbodrill. Several Russian engineers perfected multi-stage turbodrills during the 1940's and 1950's and by the early 1960's, the Russians were drilling 80 to 90% of their wells with axial flow turbodrills. Russians licensed turbodrill technology to companies in the United States, France, Germany and Austria. Turbodrills have had a rather limited commercial acceptance and are used primarily in directional wells.

Virtually all down hole drilling motors have four basic components;
1. Motor section
2. Vertical thrust bearings
3. Radial bearings
4. Rotary seal The bearings and seals can be placed in a separate package or unit at the motor section and thus can be used on any type of motor (i.e. turbodrills, positive displacement motors, etc.).

There are two basic type of down hole drilling motors:
1. Turbodrills
2. Positive displacement Turbodrills utilize the momentum change of drilling fluid (i.e. mud) passing through curved turbine blades to provide torque to turn the bit. Diamond bits are used on most turbodrills because these motors turn at speeds of 600 to 1,000 rpm whereas roller-type rock bits operate effectively only at speeds up to about 150 rpm. Positive displacement motors have fixed volumetric displacement and their speed is directly proportional to the flow rate. There are three basic types of positive displacement motors in use or currently under development:
1. Moineau motor
2. Flexing vane motor
3. Sliding vane motor These motors have large volumetric displacement and therefore deliver higher torques at lower speeds.

Thrust bearing failures in down hole motors is a problem because of high dynamic loads produced by the action of the bits and by drill string vibrations. One major oil company placed a recorder at the hole bottom and found that dynamic loads were often 50% higher than the applied bit weight. It was found on occasion that the bit bounced off bottom and produced loads in excess of 120,000 pounds when drilling at an applied bit weight of 40,000 pounds. These high loads can cause rapid failure of the thrust bearings; consequently these bearings must be greatly over designed to operate in the hostile down hole environment.

Two types of bearings have been used in down hole drilling motors:
1. Rubber friction bearings
2. Ball or roller bearings In existing motors, these bearings operate directly in the abrasive drilling mud and usually wear out in 20 to 100 hours. In addition, the rubber friction bearings have high friction and therefore absorb 30 to 40% of the output torque of the turbodrills. The lift of the vertical thrust bearings can be increased by operating at bit weight when nearly balance the hydraulic down thrust removing most of the load from these bearings.

Radial bearings are required on each side of drilling motors and on each side of the vertical thrust bearings. These radial bearings are usually subjected to lower loads than the thrust bearings and therefore have much longer life. The basic types of radial bearings are used in down hole motors:
1. Marine bearings
2. Roller or ball bearings Most motors contain marine bearings made of brass, rubber, or similar bearing materials. The marine bearings are cooled by circulating mud through them.

Rotary seals are currently the weakest link in down hole motor design. Improved seals would allow the bearings to be sealed in lubricant, thereby increasing their life substantially. Improved seals would allow bits to be operated at higher pressures thereby greatly increasing drilling rate.

There are six basic types of seals that have been tested in down hole motors:
1. Packing seals
2. Face seals
3. Labyrinth seals
4. Radial lip seals
5. Constrictions (friction bearings and marine bearings)
6. Flow metering seals Existing drilling motors allow drilling mud to continuously leak through the rotary seals by constricting the flow with any of a variety of seals permitting leakage. Sand and other abrasive particles are filtered out of the mud in the rotary seals which results in rapid failure of the seals. Any substantial improvement in turbodrill design will require positive seals which allow no appreciable leakage and preferably having some arrangement to balance the pressure on the upper and lower seals.

SUMMARY OF THE INVENTION

A downhole drilling motor, e.g. a turbodrill, which is connected to a string of drill pipe has a rotating shaft for driving a drill bit which may be a rotary bit or a high speed solid head diamond bit. The turbine section has rotor and stator blades which are crescent shaped in cross section with each blade having an exit angle of 14°–23° for maximum turbine efficiency. The drilling motor may alternatively be a positive displacement motor. The bearing shaft is provided with chevron rotary seals positioned below the rotary bearings carrying both radial and vertical thrust. Fluid lubricant fills the space from the rotary seals to a predetermined level above the bearings. A piston seals the lubricant chamber and is pressurized by drilling fluid (i.e. mud) flowing through the tool. A layer of lubricant fluid overlies the first piston and has a second piston covering said fluid and transmitting pressure from the drilling fluid to the lubricant fluid surrounding the bearings. The drilling mud is divided into two streams, one of which rotates the drill bit, and the other of which passes through the drill bit. The pressure drop across the drill bit equals the pressure drop across the drilling motor, thus balancing the pressure on the bearing seals.

BRIEF DESCRIPTION OF THE DRAWINGS

FIG. 1A is a view of the uppermost portion of a turbodrill, partly in elevation and partly in vertical section and further broken vertically to reduce the length of the turbine section and illustrating one embodiment of an arrangement to provide a balanced pressure across the bearing seals;

FIG. 1B is a view partly in elevation and partly in vertical section of the next successive lower portion of the turbodrill and illustrating an improved turbine seal;

FIG. 10 is a view of the next lower portion of the turbodrill partly in elevation and partly in section and illustrating an improved seal and an improved bearing arrangement therein;

FIG. 1D is a view of the turbodrill partly in elevation and partly in vertical section showing the bottommost portion of the drill including the connection from the drill motor to the drill bit;

FIG. 2A is a view of the uppermost portion of a modified turbodrill, partly in elevation and partly in vertical section and further broken vertically to reduce the length of the turbine section and illustrating another embodiment of an arrangement to provide a balanced pressure drop across the bearing seals;

FIG. 2B is a view partly in elevation and partly in vertical section of the next successive lower portion of the modified turbodrill and illustrating an improved turbine seal;

FIG. 2C is a view of the next lower portion of the modified turbodrill partly in elevation and partly in section and illustrating an improved seal and an improved bearing arrangement therein;

FIG. 2D is a view of the modified turbodrill partly in elevation and partly in vertical section showing the bottommost portion of the drill including the connection from the drill motor to the drill bit;

DESCRIPTION OF THE PREFERRED EMBODIMENTS

Referring to the drawings by numerals of reference and more particularly to FIGS. 1A to 1D, inclusive, there is shown a turbodrill which is generally designated 10. Turbodrill 10 is very long in relation to its width and requires FIGS. 1A, 1B, 1C and 1D to show its entire structure even though a substantial portion of the turbine section is omitted in FIG. 1A. A typical turbodrill of this design which is 7-¾ inches in diameter is about 20.5 feet long. The turbine section represents almost half the length of the turbodrill and its is therefore necessary to omit a large portion of the multi-stage turbine.

At the upper end of turbudrill 10 there is provided a stator housing sub 11 having a threaded box end portion 12 forming a threaded connection 13 with the lower end of of a drill string 14. Stator housing sub 11 has an internal longitudinal passage 15 communicating with the open end of drill string 14.

Stator housing sub 11 has a threaded pin portion 16 which is threadedly connected as at 17 in the box end portion 18 of the stator housing 19. Stator housing box portion 18 has an internal annular groove 20 therein which mates, when assembled, with an annular groove 21 in the pin potion 16 of stator housing sub 11. A lock ring 22 extends peripherally around the turbodrill in the annular space provided by matching grooves 20 and 21 and abuts the walls of said grooves to prevent disassembly of said stator housing from said stator housing sub accidentally. Stator housing box portion 18 is also provided with a plurality of holes 23 uniformly spaced to provide points for application of pressure to lock ring 22 to permit separation of stator housing 19 from stator housing sub 11. Details of this feature of construction are shown and described in FIGS. 6 and 7 of copending application Ser. No. 849,979, filed Nov. 9, 1977. Threaded connection is sealed against leakage by "O" ring 24 positioned in groove 25.

The turbine section of the turbodrill is positioned in the stator housing 19 just below the threaded joint 17 connecting to the stator housing sub 11. The stator portion of the turbine consists of a plurality of stator members, 26 which are shown in more detail in FIGS. 3, 3A, 4 and 5 of copending application Ser. No. 849,976 filed Nov. 9, 1977. The stator members 26 are annular in shape and provided with vanes or blades 27. Stator members 26 have an exterior surface providing a sliding fit in the inner surface of stator housing 19. Stator members 26 are positioned as a stack of abutting members extending longitudinally within the stator housing 19. In a typical turbodrill having a 7¾ inch diameter, there are 50 of the stator members and 50 of the matching rotor members.

The stator members are preferably made of a hard beryllium copper alloy which is wear-resistant and which has a slightly higher coefficient of expansion than the steel of stator housing 19. The stack of stator members 26 is maintained under compression in the stator housing 19 with the result that the members are expanded to fit tightly against the inner surface of stator housing 19 and resist slippage therein. Also, because of the higher thermal coefficient of expansion, the stator members 26 tend to expand more at the high temperatures encountered in use of the turbodrill with the result that the increase in temperature encountered during operation causes stator members 26 to fit more tightly within stator housing 19 and effectively prevents slippage therein.

At the upper end of stator housing 19, there is positioned an annular stator spacer 28 which positions the uppermost stator member 26 relative to the end of stator housing sub 11. At the lower end of stator housing 19 there is a box portion 29 which is internally threaded and receives tubular stator makeup sleeve 30 in a threaded joint 31. The lower end of sleeve 30 is notched as indicated at 32 to receive a wrench for tightening sleeve 30 in threaded joint 31. When stator makeup sleeve 30 is tightened to the position shown, the upper end thereof abuts the lowermost stator member 26 and compresses the entire stack of stator members against each other and against annular stator spacer member 28. Stator makeup sleeve 30 when fully tightened maintains the stack of stator members 26 under sufficient compression to press them tightly against the inner suface of stator housing 19 and prevents slippage of the stator members during operation as described above.

The lower box end 29 of stator housing 19 is connected in a threaded joint 33 to the threaded upper pin end 34 of bearing pack housing 35. Just below threaded joint 33, there is provided annular groove 21a in bearing pack housing 35 and annular groove 20a in stator housing 19 and a spring lock ring 22a positioned therein to prevent separation of the members accidentally. The lower end of stator housing 19 is provided with holes 23a providing points for application of pressure to lock ring 22a to permit threaded joint 33 to be separated. An "O" ring 24a positioned in groove 25a prevents leakage of fluid through threaded joint 33.

Bearing pack housing 35 extends from threaded joint 33 at its upper end to a lower box end portion 36 which is internally threaded and has a threaded joint 37 with bearing makeup sub 38. At its extreme upper end, bearing pack housing 35 has an interior diameter defining an inner surface 39 which is an extension or projection of the inner surface of stator makeup sleeve 30. A short distance below the upper end of bearing pack 35, the interior diameter thereof is enlarged at beveled surface 40 to surface 41 defining a lubricant chamber which will be subsequently described in more detail. At the lower end of surface 41 defining lubricant chamber, there is a bevel or shoulder 42 opening into a still further enlarged portion having inner surface 43 enclosing the various radial and thrust bearings. Surface 43 terminates in the interior threaded portion at the lower box end 36 of the bearing pack housing.

At the upper end of the turbodrill, inside stator housing 19, there is positioned rotor shaft 44 which has a generally cylindrical exterior surface 45 terminating at the upper end in threaded portion 46 and at the lower end in threaded portion 47. Rotor shaft 44 has a plurality of rotor members 48 stacked thereon in abutting relationship and blades or vanes 49 vertically aligned with the stator vanes 27.

Stator member 26 comprises an outer sleeve 50 and inner sleeve 51 with vanes or blade members 27 positioned therebetween and uniformly spaced around the periphery thereof. The outer surface of outer sleeve 50 abuts the inner surface of stator housing 19 securely to prevent slippage of the stator member relative to the housing. The inner surface of inner sleeve 51 is a smooth bearing surface in which rotor members 48 are guided for smooth rotary motion.

Rotor members 48 comprise hub portion 52 from which blade or vane members 49 extend and sleeve portion 53. The exterior surface 54 of sleeve portion 53 is a smooth bearing surface which fits the inner bearing surface of inner sleeve 51 of stator member 26. The inner surface 55 of sleeve 53 and hub 52 is a smooth surface and is provided with groove or keyway (not shown) for securing rotor members 48 non-rotatably on rotor shaft 44. The blade or vane members are generally crescent-shaped in cross-section. Vane member 49 has an upper end which is the inlet end of the vane for receiving fluid (i.e. mud) and a lower end which is the outlet or exit end for discharge of fluid from the blade or vane. The shape of the blades or vanes is critical in the design of this turbodrill. In particular, the exit angle of the blade or vane must be in a very narrowly defined range in order to produce a maximum torque in the turbine. The exit angle of the blade or vane 49 is measured as the angle between a tangent to a curve lying on the mid points between the inner curve and outer curve of blade or vane member 49 and a line normal to the center line of the rotor. The exit angle must lie within a range from 14° to 23° and an angle of 18°–21° is preferred. At this exit angle for the blade or vane member, the maximum rotary thrust or torque is obtained for the turbine. The structure of the vane or blade members 27 of stator 26 is the mirror image of vane or blade members 49 in all details.

Rotor members 48 are positioned on rotor shaft 44 in a stacked relation, as shown in FIG. 1A, with vane or blade members 49 aligned vertically with vane or blade members 27 of stator members 26. Rotor members 48 are positioned on shaft 44 with the keyways thereof aligned and aligned with a longitudinally extending groove in rotor shaft 44. A steel wire (not shown) is inserted in the mating grooves (not shown) of shaft 44 and rotor members 48 to secure the rotor members non-rotatably thereon. The lower end of the stack of rotor members abuts rotor spacer ring 64 which seats against the upper end 65 of splined connecting member to be subsequently described. At the upper end of rotor shaft 44 there is positioned a cap or makeup screw member 66 which is internally threaded at 67 and forms a tight threaded connection with the threaded end portion 46 of rotor shaft 44. When cap member 66 is tightened in position its lower end portion 68 abuts the uppermost rotor member 48 and compresses the stack of rotor members tightly on rotor shaft 44. Cap member 66 has a central opening 166 and has one or more threaded apertures 69 in which there are positioned set screws 70 to secure cap member 66 against loosening during operation. At the lower end of the turbine section, adjacent to the lowermost rotor vanes, there are provided one or more openings 235 through the wall of housing 19 for discharge of drilling fluid therethrough, optionally, a shield 236 may be provided outside openings 135.

Upper spline member 71 has its upper end portion 65 abutting rotor spacer ring 64 as previously described. Spline member 71 is internally threaded and forms a threaded connection 72 with the lower end portion 47 of rotor shaft 44. Spline member 71 is hollow and has an exterior surface 73 spaced from the inner surface of stator makeup sleeve 30 to define an annular passageway therebetween. The lower end portion 75 of spline member 71 abuts ring-shaped spline spacer 76. Spline member 71 has a plurality of grooves 77 in the lower or box portion 75 thereof which receive spline pins 78. A lower spline member 79 has upper pin portion 80 provided with grooves 81 which receive the other side of spline pins 78. Spline member 79 has a peripheral shoulder 82 which receives the lower end of spacer member 76. The lower or box end 83 of spline member 79 is internally threaded to receive the upper end of bearing shaft 84 in a threaded connection as indicated at 85. A set screw 86 is provided to prevent loosening of threaded joint 85 during operation. Spline member 79 has interior longitudinal passage 87 which communicates with passage 74 in member 71 and opening 166 at one end and with the interior longitudinal passage 88 in bearing shaft 84 at the other end. Spline members 71 and 79 and spline pins 78 provide a splined drive connection between rotor shaft 44 and bearing shaft 84.

Bearing shaft 84 is provided with an upper sleeve 89 which abuts the lower end of spline member 79 at its upper end and abuts another bearing shaft sleeve 90 at its lower end. The outer surface of sleeve 89 is spaced from the inner surface 41 of bearing pack housing 35 to define an annular passage 91 in which there are positioned a lubricant grease or oil and a pair of annular-shaped floating piston members 92 and 93, respectively. Piston member 92 comprises a piston body 94 with chevron-shaped seals 95 on one side and elastic compressible seals 96 on the other side. Seals 95 and 96 are compressed by end cap 97 held in place by a cap screw (not shown). The seals on piston member 92 are of well known design and include a central spacer member and end spacers which are compressed against the seals by end cap 97. Piston member 93 is constructed identically to piston member 92 and the detailed parts thereof are not separately identified. Piston members 92 and 93 have a sliding fit in the space between the inner surface 41 of bearing pack housing 35 and the outer surface of sleeve member 89 and have lubricant, grease or oil positioned between the piston members and in the space below piston member 93.

The bottom end of lubricant chamber 91 is defined by the upper surface of bearing shaft sleeve 90 and the upper end surface of housing upset ring spacer 98. At the lower end of lubricant chamber 91 there are provided a pair of openings closed by pipe plugs 99 and 100, which are used for filling the chamber 91 with lubricant.

The lower end of member 98 is enlarged and has a shoulder portion 101 which abuts the bevel or shoulder 42 on housing 35. The lower end of spacer 98 abuts the upper end of bearing housing spacer 102. Positioned below sleeve 90 and spacer 102 are a series of radial bearings and vertical thrust bearings which are sealed against lubricant leakage at the bottom of the drill by a radial seal.

The upper radial bearing consists of an outer ring 103 which supports a plurality of equally spaced roller bearing elements 104. A separate bearing ring 105 is positioned on bearing shaft 84 and completes the radial bearing assembly. A radial bearing of this design is adequate for a high speed turbodrill of the type disclosed herein. A suitable radial bearing for a 7¾ inch turbodrill is the MR-64 or MR-88 bearing manufactured by McGill Manufacturing Co., Inc., Valparaiso, IN 46383.

A bearing shaft sleeve 106 is positioned in bearing shaft 84 for rotation therewith and abuts the lower end of bearing ring 105 which is also fitted on bearing shaft 84 for rotation therewith. Ring member 107 is fitted tightly inside housing 35 and has sufficient clearance from sleeve 106 to permit rotation thereof. The upper end of ring 107 abuts the lower end of bearing ring 103 which is also tightly fitted in housing 35. The lower end of ring 107 is provided with a pair of grooves 108 in which there are positioned compression springs 109. Spring washer 110 fits against compression springs 109 and abuts the upper annular plate or bearing ring 111 of the uppermost vertical thrust bearing. The vertical thrust bearing consists of upper bearing ring 111, lower bearing ring 112, and a plurality of roller bearing elements 113 spaced equally around the bearing and secured in place by a bearing race (not shown). Upper bearing ring 111 fits tightly against housing 35 and has a clearance relative to sleeve 106. Lower bearing ring 112 has a tight fit on sleeve 106 and a clearance relative to the inner wall surface of housing 35.

A thrust bearing spacer ring 114 is fitted tightly on bearing shaft 84 and has a clearance relative to housing 35. The upper end of spacer 114 is provided with a pair of grooves 115 in which there are positioned compression springs 116 whichs press against lower bearing ring 112. The lower end of spacer 114 abuts bearing shaft sleeve 117 and is provided with a pair of grooves 118 in which there are positioned compression springs 119. The lower end of spacer 114 also abuts the upper ring of the lower vertical thrust bearing.

The lower vertical thrust bearing consists of upper ring 120 which fits tightly on bearing shaft sleeve 117 and has a small clearance relative to the inner surface of housing 35. There is also provided a lower bearing ring 121 and a plurality of roller bearings equally spaced and secured in place by a bearing race (not shown). Lower bearing ring 121 fits tightly inside housing 35 and has a slight clearance relative to bearing shaft sleeve 117. Immediately below the lower bearing ring 121 is spring washer 123 which bears against compression springs 124 carried in grooves 125 in the upper end of ring member 126. Ring member 126 is the same as ring member 107, but, reversed in position.

Below ring member 126 and sleeve 117 there is positioned the intermediate radial thrust bearing. This bearing consists of outer bearing ring 127 which carries a plurality of roller bearing members 128 secured thereon for rotary movement. An inner ring 129 is secured on bearing shaft 84.

Below the intermediate radial bearing there is positioned bearing housing spacer 130 which fits tightly within the bearing housing 35. There is also positioned bearing shaft upset spacer ring 131 which has a shoulder 132 which abuts against shoulder 133 on the bearing shaft. Space between spacers 130 and 131 is sufficient for passage of lubricant to the lower radial bearing.

Spacers 130 and 131 abut the upper end portions of the lowermost radial bearing. This bearing consists of outer ring 134 which has a plurality of equally spaced roller bearing members 135 secured thereon and bearing ring 136. Outer ring 134 is tightly fitted inside housing 35 and inner bearing ring 136 is fitted on bearing shaft 84 for rotation therewith.

At the lower end of housing 35, bearing makeup sub 38 is tightened against the lower end of bearing ring 134 of the lowermost radial bearings. On the bearing shaft 84 there is positioned bearing seal sleeve 137 which, at its upper end abuts the lower end of bearing ring 136 and at its lower end abuts bearing shaft end ring 138 which is fitted on shoulder 139 of the enlarged lower end 140 of the bearing shaft. Bearing makeup sub 38 is secured against separation of its threaded connection by cooperating grooves 20b and 21b enclosing lock ring 22b. Holes 23b provide for application of pressure for release of lock ring 22b. Sub 38 is also provided with a peripheral groove 24b in which there is positioned an "0" ring seal 25b.

A dynamic radial seal is provided between sub 38 and seal sleeve 137 to prevent loss of lubricant from the bearings. The seal is a chevron-type seal having upper and lower backup rings 141 and 142, respectively. The middle portion of the seal is a spacer member 143. Above and below the spacer medium are positioned a plurality of chevron seals 144 which are maintained in compression to provide a seal against sub 38 and against sleeve 137 to prevent leakage of lubricant from the bearings during operation of the turbodrill. Upper spacer member 141 abuts a retaining ring 145 and is held in place thereby. The lower end of spacer ring 142 abuts compression spring 146 which is positioned in groove 147.

The lower enlarged end portion 140 of bearing shaft 84 is threaded internally as indicated at 148. This threaded opening receives and secures in place the hollow connector sub 149 (having internal passageway 151) of drill bit 150. The turbodrill is illustrated as driving a rotary-type drill bit 150. It should be understood, however, that any suitable drill bit could be used of the various types used with conventional drills utilizing various types of down hole motors. In particular, the turbodrill is particularly useful with solid head diamond bits as is illustrated in Fox, U.S. Pat. No. 3,971,450.

OPERATION

The turbodrill is assembled as illustrated in FIGS. 1A, 1B, 1C, and 1D. The housing is in several sections, as described above, and is threadly connected at several points. Since the turbodrill housing is held stationery and the drill is driven at high speed, there are substantial torques placed upon the threaded joints which tend to cause those joints to unscrew. In the past, threaded joints have been protected against unscrewing by use of set screws. However, set screws sometimes come loose themselves and the desired protection for the threaded joint may not be obtained. In this construction, the threaded joints are protected by the lock ring arrangement which is shown in use for several threaded connections.

During assembly of the apparatus a suitable lubricant grease or oil, which will withstand the temperatures normally encountered by the turbodrill, is introduced through the lower opening 100, after unplugging the same, to fill the lower portion of the turbodrill with lubricant. The lubricant introduced through opening 100 fills and completely surrounds the bearings and the radial seals. Lubricant is also introduced through opening 99, after unplugging the same, to fill the space above piston 93 (as shown in dotted lines) and cause piston 92 (as shown in dotted lines) to rise above it. Sufficient lubricant is introduced to cause the pistons to be positioned substantially as shown in full line in FIGS. 1B and 1C. The holes 99 and 100 are plugged to prevent loss of lubricant.

When the turbodrill is connected to drill string 14 as shown in FIG. 1A, drilling mud is pumped through the drill string at a high rate of flow and through the turbodrill. The drilling mud flows through passage 15 and divides into two streams, one of which flows through passage 166 and the other of which flows into the annular space at the upper end of the turbine section. The drilling mud which flows through each of the turbine stages causes the turbine to rotate at a high speed. One stream of drilling mud flows past each of the vanes 27 of the stator members 26 and is directed from those vanes at a high velocity against vanes 49 of rotor members 48. The shape of the vanes of the stator and rotor members has been discussed fully in connection with the description of the assembled apparatus. The shape of the vanes, particularly the exit angle, is designed to create a maximum thrust on the rotor members and a maximum torque on the rotor shaft 44 as the one stream of drilling mud is pumped through the turbine section. As indicated above, a large number of turbine elements make up the turbine section. In a typical 7¾ inch turbodrill, there are fifty sets of stator members and fifty sets of rotor members, which results in the production of a high torque and a high speed of turning of the rotor shaft 44. The steam of drilling mud passing through the burbine section exists through passages 235 into the annulus (drill hole) around the turbodrill. The pressure of the drilling mud at the point of exit is essentially the hydrostatic pressure in the drill hole.

The rotor shaft 44 which is turning at a high rate of speed is connected by a splined connection, as described above, to bearing shaft 84. Some of the drilling mud flows from the turbine section into the annular space around the splined connection at the top of the bearing shaft and applies a hydraulic force against the upper end of piston 92. The piston 92 is therefore maintained under the hydrostatic pressure of the stream of drilling mud which is exiting from the turbine section. The pressure on piston 92 presses against the lubricant in the space 91 and applies pressure through piston 93 to maintain the lubricant in the space below the piston 93 and lubricant around the bearings and radial seal under a substantial hydrostatic pressure. In the past, floating pistons have been used to pressurize lubricant systems in turbodrills. However, drilling mud has eventually eroded the pistons and penetrated into the bearing and sealing areas which resulted in the destruction of the working parts of the turbodrill. In this construction, the double piston arrangement with lubricant providing a hydraulic fluid between the pistons protects the lower piston against contamination by the drilling mud and provides protection and greater life for the seal.

In the operation of the turbodrill, the design of bearings and of seals is of critical importance. The bearings and the seals in prior art turbodrills are the points where the highest incidence of failure has occurred. The radial bearings are not a major problem in that the radial loads are much smaller than the thrust loads and the space constraints are not so great as on the radial bearings. As described above, roller-type radial bearings are used herein, McGill MR-64 and MR-88 bearings being a preferred type.

In this turbodrill the thrust bearings are an important feature of construction. There are two sets of thrust bearings used. The upper thrust bearings carry the upper thrust produced during drilling. The lower thrust bearings carry the load produced when the motor is rotated off bottom. The preferred thrust bearings described above are roller-type thrust bearings supported between two annular plates or rings. A suitable thrust bearing, which is used in this apparatus, is the ATH734 roller thrust bearing manufactured by Andrews Bearing Corporation, Spartanburg, South Carolina 29304. This bearing will carry a dynamic load of 122,000 pounds.

As noted above, the seals in the bearing section and the lubrication system are of substantial importance. The bearings in prior art turbodrills have had very short lives because they operated under direct exposure to the drilling mud. In this improved turbodrill, the entire bearing section is operated with a sealed lubrication system where the oil or grease is pressurized by floating pistons as previously described. The seals which prevent the loss of lubricant from the bearing section are most important. The prior art drills which have attempted to use sealed lubricant systems have generally used packing type seals or compressed rubber seals which in many cases apply such high forces to the bearing shaft as to make it difficult to rotate. In this improved turbodrill, the rotary seal for the bearings is a multiple chevron-type seal which prevents loss of lubricant, prevents intrusion of drilling mud to the bearings, thus increasing substantially the life of the bearings and of the drill. The stream of drilling mud which passes through passages 166, 74, 88 and 151 and exits into the space adjacent the drill bit is balanced in pressure against the bottom hole pressure, and that pressure is applied against the bottom seals. As a result, there is no pressure drop across the bearing seals. The theory of operation is given below.

Drilling mud passes through the motor in two streams. The majority of the mud passes ($Q_t$) through the turbine blades and then vents to the annulus above the rotary seal. The remaining mud ($Q_b$) passes through the rotor and through the drill bit. The distribution of flow through these two passageways is controlled by the diameter of the nozzles used in passage 151 of the bit. The smaller the nozzles, the smaller the amount of fluid passing through the drill bit. The fact that mud is vented directly from the bottom of the turbine blades to the annulus allows annulus mud pressure to be applied to the floating piston in the lubricant reservoir. Consequently, the rotary seal is subjected to annulus mud pressure on each side, thereby removing all differential mud pressure from the rotary seal.

This design reduces the mud pump pressure required to operate the turbodrill since with conventional turbodrills the bit pressure and turbine pressure are additive whereas with this design, they operate in parallel. This concept can be used equally well with positive displacement motors (e.g., Moineau, vane, gear, etc.)

The total flow, Q, through the motor equals:

$$Q = Q_t + Q_b \tag{1}$$

where $Q_t$ = Flow rate through turbodrill passage 235
$Q_b$ = Flow rate through drill bit passage 151

The pressure drops across the drill bit and turbodrill are equal since they are in parallel:

$$P_b = P_t \tag{2}$$

Additional constrictions can be placed in series with either the turbodrill or the bit if so desired in order to alter the respective flow rates. The size of these constrictions can be automatically controlled in order to give the motors specific operating characteristics. For example, this can be varied as a function of flow rates, pressure drops, torques, bit weights or rotary speed.

The bit pressure drop varies as:

$$P_b = k_1 w \frac{Q_b^2}{A^2} \tag{3}$$

where $k_1$ is a constant equal to:

$$k_1 = 1/12040C^2$$

where
 w = Mud Density (lb/gal)
 $Q_b$ = Mud Flow Rate through Bit (GPM)
 C = Nozzle Coefficient ($\approx 0.95$)
 A = Nozzle Area (in$^2$)

The turbine pressure drop equals:

$$P_t = k_2 w Q_t^2 \tag{4}$$

where
 $k_2$ = Design Constant
 w = Mud Density (lb/gal)
 $Q_t$ = Mud Flow Rate through Turbodrill (GPM)

Combining Equations 2, 3, and 4:

$$\frac{k_1 w Q_b^2}{A^2} = k_2 w Q_t^2 \tag{5}$$

$$\frac{Q_t}{Q_b} = \frac{\sqrt{k_1/k_2}}{A} \tag{6}$$

Equation 6 shows that the ratio of the flow rates through the turbodrill and through the bit is inversely proportional to the nozzle area and that it is independent of the flow rate. Therefore, once the bit nozzles are selected, this ratio remains constant! This greatly simplifies the operation of this pressure balanced turbodrill.

Substituting Equation 6 into Equation 1 yields:

$$\frac{Q_t}{Q} = \frac{\sqrt{k_1/k_2}}{\sqrt{k_1/k_2} + A} \tag{7}$$

which shows that as A→0, all of the flow is through the turbodrill ($Q_t$→Q) and that flow through the turbodrill decreases as A increases.

Means for preventing drill hole erosion is required. This is done by slanting the exit passage 235 or by placing sleeve 236 around the motor to direct the fluid upward.

AN ALTERNATE EMBODIMENT

In FIGS. 2A, 2B, 2C and 2D there is shown an alternate embodiment of this turbodrill in which a different arrangement of passageways is used for balancing the pressure on the bearing seals. In the embodiment of the invention shown in these figures the structure is almost identical to that shown in FIGS. 1A, 1B, 1C and 1D. Therefore, the same reference numberals are used in describing this embodiment where the parts are the same as in the previous embodiment. In fact, the changes between the two embodiments are such that only the features that are changed need be described.

In this embodiment, the ports or openings 235 in housing 19 and the peripheral shield 236 are eliminated. In this embodiment, spline member 71 has a plurality of passages 63 opening into the interior thereof for passage of fluid from the turbine section of the turbodrill. In this embodiment, a hollow tube 62 is positioned in opening 166 in cap member 66 and is sealed against leakage by an "O" ring 61. Tube 62 has an outside diameter that is smaller than the passages through which is extends, thus leaving an annular passage around it for passage of drilling mud as will be subsequently described. The bottom end of tube 62 terminates inside the upper end of passage 61 in drill bit 150, which passage opens to the bottom of the drill hole through drill bit 150. Tube 62 is sealed in passage 61 by "O" ring 60. Tube 62 may be threaded at either or both of its ends and held rigidly in place by a threaded connection, if desired, in which case the "O" rings do not support the tube but merely seal against leakage. The cavity 59 in the lower end 140 of the bearing shaft is vented to the lower end of the bore hole either through a plurality of enlarged passages 58 in the threaded base of drill bit 150 or, optionally, through enlarged passages 57 (shown in dotted line) through the wall of the enlarged portion 140 of the bearing shaft. Passages 57, if used, are preferably inclined upward to prevent erosion of the bore hole. With the exception of the features described above, the present embodiment is the same as that shown in FIGS. 1A, 1B, 1C and 1D.

OPERATION

In this embodiment, the drilling mud passes through the turbodrill in two streams. The majority of the mud passes ($Q_t$) through the turbine blades and through passage 63 in spline member 71 into the annular space around tube 62. The mud then passes on through this annular space through the bearing section into the enlarged interior space 59 in the lower end portion 140 of the bearing shaft. This larger flow of drilling mud then passes out into the bore hole either through passages 58 in the drill bit or passages 57 in enlarged portion 140 of the bearing shaft. Thus mud flow, which passes through the turbine section, is operable to cause the turbine to rotate the drill bit for carrying on the drilling operation. The smaller stream of drill mud passes into tube 62 and vents into the bottom of the drill hole through passage 61 in drill bit 150. The distribution of flow through the smaller opening 61 or through the large passages 58 or 57 is controlled by the diameter of nozzles provided for flow control. The smaller the nozzle in passage 61 the smaller the amount of mud passing through the drill bit. The fact that mud is vented from the bottom of the turbine blades to the bottom of the drill hole allows bottom hole mud pressure to be applied to the floating piston in the lubricant reservoir. The bottom lubricant seals are likewise subjected to bottom hole mud pressure. Consequently, the rotary seals are subjected to bottom hole mud pressure on each side and thus removing all differential mud pressure from the rotary seal.

The total flow, Q, through the motor equals:

$$Q = Q_t + Q_b \tag{1}$$

where
$Q_t$ = Flow rate through turbodrill passages 63 and 58 (or 57)
$Q_b$ = Flow rate through drill bit passage 61

The pressure drops across the drill bit and turbodrill are equal since they are in parallel:

$$P_b = P_t \tag{2}$$

Additional constrictions can be placed in series with either the turbodrill or the bit if so desired in order to alter the respective flow rates. The size of these constrictions can be automatically controlled in order to give the motor specific operating characteristics. For example, this can be varied as a function of flow rates, pressure drops, torques, bit weights or rotary speed.

The bit pressure drop varies as:

$$P_b = k_1 w \frac{Q_b^2}{A^2} \tag{3}$$

where k is a constant equal to:

$$k_1 = \frac{1}{12040 C^2}$$

where
w = Mud Density (lb/gal)
$Q_b$ = Mud Flow Rate through Bit (GPM)
C = Nozzle Coefficient (0.95)
A = Nozzle Area (in$^2$)

The turbine pressure drop equals:

$$P_t = K_2 w Q_t^2 \tag{4}$$

where
$k_2$ = Design Constant
w = Mud Density (lb/gal)
$Q_t$ = Mud Flow Rate through Turbodrill (GPM)

Combining Equations 2, 3, and 4:

$$\frac{k_1 w Q_b^2}{A^2} = k_2 w Q_t^2 \tag{5}$$

$$\frac{Q_t}{Q_b} = \frac{\sqrt{k_1/k_2}}{A} \tag{6}$$

Equation 6 shows that the ratio of the flow rates through the turbodrill and through the bit is inversely proportional to the nozzle area and that it is independent of the flow rate. Therefore, once the bit nozzles are selected, this ratio remains constant! This greatly simplifies the operation of this pressure balanced turbodrill.

Substituting Equation 6 into Equation 1 yields:

$$\frac{Q_t}{Q} = \frac{\sqrt{k_1/k_2}}{\sqrt{k_1/k_2} + A} \tag{7}$$

which shows that as A→O, all of the flow is through the turbodrill ($Q_t$→Q) and that flow through the turbodrill decreases as A increases.

The arrangements described above have provided for balancing the pressure on the bearing seals for a turbodrill. The arrangement of flow passages would work equally well in a down hole motor of the positive displacement type (e.g. Moineau, vane, gear, etc. type motors).

While this invention has been described fully and completely, with special emphasis upon two preferred embodiments, it should be understood that within the scope of the appended claims this invention may be practiced otherwise than as specifically described herein.

I claim:

1. A down hole well drilling tool adapted for connection at one end to the lower end of a drill string and at the other end to a drill bit to be driven thereby comprising:
   tubular housing means,
   rotary shaft means supported in said housing means and extending therefrom for supporting a drill bit,
   motor means in said housing means for actuation by flow of drilling fluid therethrough and operable to rotate said shaft means,
   bearing means in said housing means supporting said rotary shaft means,
   a first rotary seal positioned between said shaft means and said housing means below said bearing means and subjected to drilling fluid pressure outside said housing means,
   a second rotary seal positioned between said shaft means and said housing means above said bearing means,
   lubricant fluid filling the space around said bearing means between said seals,
   a first passageway opening from the inlet side of said motor means through said motor means and said rotary shaft means to a point outside said housing means adjacent to the drill bit,
   a second passageway opening from a point adjacent to the outlet end of said motor means through the wall of said housing means to a point outside said said wall, and in fluid communication with said second rotary seal to subject the same to the pressure of drilling fluid outside said housing, and
   said first and said second passageways being connected in parallel and of a relative size such that the pressure drop through said motor means is substantially equal to the pressure drop along said first passageway, whereby the pressure applied to said first and second rotary seals is balanced.

2. A downhole well drilling tool according to claim 1 in which said second passageway extends diagonally rearward.

3. A downhole well drilling tool according to claim 1 in which a peripherally extending sheild is provided on said housing means adjacent to the outlet of said second passageway to direct drilling fluid emerging therefrom in a direction rearward of said housing.

4. A downhole well drilling tool according to claim 1 including a drill bit supported on said shaft means and having a passage aligned with and forming a part of said first passageway.

5. A downhole well drilling tool according to claim 1 in which said tool is a turbodrill and said motor means comprises
   a stator having a plurality of fixed turbine blades, and
   a rotor shaft extending therethrough and having a plurality of rotor blades cooperable with said stator blades to direct the flow of drilling fluid to rotate said shaft.

* * * * *